United States Patent
Sonoda et al.

(10) Patent No.: US 10,738,168 B2
(45) Date of Patent: *Aug. 11, 2020

(54) RANDOM MAT AND FIBER-REINFORCED COMPOSITE MATERIAL SHAPED PRODUCT

(71) Applicant: Teijin Limited, Osaka-shi, Osaka (JP)

(72) Inventors: Naoaki Sonoda, Matsuyama (JP); Makoto Ootsubo, Matsuyama (JP); Takeru Ohki, Matsuyama (JP)

(73) Assignee: Teijin Limited, Osaka-Shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/382,051

(22) PCT Filed: Jul. 30, 2013

(86) PCT No.: PCT/JP2013/070603
§ 371 (c)(1),
(2) Date: Aug. 29, 2014

(87) PCT Pub. No.: WO2014/021315
PCT Pub. Date: Feb. 6, 2014

(65) Prior Publication Data
US 2015/0203642 A1   Jul. 23, 2015

(30) Foreign Application Priority Data
Aug. 1, 2012 (JP) ................................. 2012-171142

(51) Int. Cl.
*C08J 5/06* (2006.01)
*C08J 5/04* (2006.01)
(Continued)

(52) U.S. Cl.
CPC ............... *C08J 5/046* (2013.01); *C08J 5/042* (2013.01); *C08J 5/043* (2013.01); *D04H 1/4218* (2013.01);
(Continued)

(58) Field of Classification Search
CPC .......... B32B 2250/10; B32B 2260/021; B32B 2260/046; B32B 2262/101;
(Continued)

(56) References Cited

U.S. PATENT DOCUMENTS 3,903,248 A * 9/1975 Kalnin ...................... D01F 9/24
423/447.4
4,677,818 A * 7/1987 Honda ................... D07B 1/025
57/224
(Continued)

FOREIGN PATENT DOCUMENTS

JP     H05-9853 A     1/1993
JP     2001-192466 A  7/2001
(Continued)

OTHER PUBLICATIONS

Hearn, E.J., "Mechanics of Materials vol. 1—An Introduction to the Mechanics of Elastic and Plastic Deformation of Solids and Structural Materials—Chapter 11: Strain Energy", Dec. 1997, Elsevier, 3rd Edition, p. 254-296.*
(Continued)

*Primary Examiner* — Maria V Ewald
*Assistant Examiner* — Ethan Weydemeyer
(74) *Attorney, Agent, or Firm* — Banner & Witcoff, Ltd.

(57) ABSTRACT

Provided is a fiber-reinforced composite material shaped product having isotropy and mechanical strength and a random mat used as an intermediate material thereof.
The random mat includes reinforcing fibers having an average fiber length of 3 to 100 mm and a thermoplastic resin, in which the reinforcing fibers satisfy the following i) to iii).
(Continued)

i) A weight-average fiber width (Ww) of the reinforcing fibers satisfies the following Equation (1).

$$0.03 \text{ mm} < Ww < 5.0 \text{ mm} \quad (1)$$

ii) An average fiber width dispersion ratio (Ww/Wn) defined as a ratio of the weight-average fiber width (Ww) to a number-average fiber width (Wn) of the reinforcing fibers is 1.8 or more and 20.0 or less.

iii) A weight-average fiber thickness of the reinforcing fibers is smaller than the weight-average fiber width (Ww).

16 Claims, 2 Drawing Sheets

(51) Int. Cl.
| | |
|---|---|
| C08J 5/24 | (2006.01) |
| D04H 1/72 | (2012.01) |
| D04H 1/4342 | (2012.01) |
| D04H 1/4242 | (2012.01) |
| D04H 1/4218 | (2012.01) |

(52) U.S. Cl.
CPC ......... *D04H 1/4242* (2013.01); *D04H 1/4342* (2013.01); *D04H 1/72* (2013.01)

(58) Field of Classification Search
CPC ........ B32B 2262/106; B32B 2307/308; B32B 2307/734; B32B 2457/00; B32B 27/08; B32B 27/12; B32B 15/08; B32B 2250/02; B32B 2262/10; C08J 5/06; C08J 2323/12; H05K 1/036; H05K 1/0366; H05K 2201/0323; Y10T 428/24149; Y10T 428/24942; Y10T 428/249923; Y10T 428/24994; Y10T 428/249945; Y10T 428/29; Y10T 428/2913; Y10T 428/2918; Y10T 428/2924; Y10T 428/2967; Y10T 442/668; Y10T 442/696; Y10T 442/697

See application file for complete search history.

(56) References Cited

U.S. PATENT DOCUMENTS

| | | | | |
|---|---|---|---|---|
| 5,098,610 | A * | 3/1992 | Okamura | C08K 3/04 |
| | | | | 252/502 |
| 5,679,456 | A | 10/1997 | Sakai et al. | |
| 5,824,410 | A | 10/1998 | Sakai et al. | |
| 6,060,010 | A | 5/2000 | Sakai et al. | |
| 6,066,395 | A | 5/2000 | Miyoshi et al. | |
| 6,444,187 | B1 | 9/2002 | Miyoshi et al. | |
| 6,607,798 | B1 * | 8/2003 | Watanabe | B29C 70/525 |
| | | | | 428/304.4 |
| 7,651,767 | B2 | 1/2010 | Hirata et al. | |
| 2003/0157320 | A1 * | 8/2003 | Rieder | C04B 16/06 |
| | | | | 428/364 |
| 2004/0137208 | A1 * | 7/2004 | Mitani | B29B 11/16 |
| | | | | 428/292.1 |
| 2005/0264307 | A1 * | 12/2005 | Setaka | G01R 1/07314 |
| | | | | 324/755.08 |
| 2006/0258810 | A1 * | 11/2006 | Sugiura | C08J 5/06 |
| | | | | 525/207 |
| 2007/0077391 | A1 * | 4/2007 | Okamoto | B32B 3/02 |
| | | | | 428/116 |
| 2007/0237954 | A1 * | 10/2007 | Kienzle | C04B 35/573 |
| | | | | 428/375 |
| 2008/0050571 | A1 | 2/2008 | Haque | |
| 2009/0062426 | A1 * | 3/2009 | Shiraki | C08F 255/02 |
| | | | | 523/205 |
| 2009/0075054 | A1 | 3/2009 | Hirata et al. | |
| 2009/0169951 | A1 * | 7/2009 | Suenaga | B82Y 30/00 |
| | | | | 429/528 |
| 2010/0068496 | A1 | 3/2010 | Hirata et al. | |
| 2011/0239602 | A1 | 10/2011 | Furuzawa | |
| 2013/0317161 | A1 | 11/2013 | Konagai et al. | |

FOREIGN PATENT DOCUMENTS

| | | |
|---|---|---|
| JP | 4161409 B2 | 10/2008 |
| JP | 2011-178890 A | 9/2011 |
| JP | 2011-178891 A | 9/2011 |
| JP | 2011-214195 A | 10/2011 |
| WO | 2001-092002 A3 | 12/2002 |
| WO | 2006-112487 A1 | 10/2006 |
| WO | 2012/105080 A1 | 8/2012 |
| WO | 2013/094706 A1 | 6/2013 |

OTHER PUBLICATIONS

Hearn, E.J., "Mechanics of Materials, vol. 1—An Introduction to the Mechanics of Elastic and Plastic Deformation of Solids and Structural Materials", Dec. 1997, Elsevier, 3rd Edition, p. 254-296.*
Jespersen et al, "Consolidation of Net-shape Random Fiber Thermoplastic Composite Preforms," As submitted with third party observations, Dec. 2010, Polymer Composites, Wiley InterScience, 2010 Edition, pp. 654-665.*
Harper, L.T., Turner, T.A., Warrior, N.A., and Rudd, C.D., "Characterisation of random carbon fibre composites from a directed fibre preforming process: The effect of tow filamentisation," ScienceDirect (www.sciencedirect.com), Composites: Part A 38 (2007) pp. 755-770.
Jan. 5, 2015—(EP) Supplementary Search Report—App 13825264.8—Eng Tran.
Jan. 26, 2015—(EP) Office Action—App 13825264.
Nov. 26, 2013—(EP) Search Report and Written Opinion—App PCT/JP2013/070603.
Sep. 29, 2015—(EP) Examination Report—App 13825264.8.
Jespersen, S.T.: Baulky, F.; Wakeman, M.D.; Michaud, V.; Blanchard, P.; Norris, R.; and Manson, J-A.E., "Consolidation of Net-shape Random Fiber Thermoplastic Composite Preforms," Polymer Composites 2010, pp. 653-665, and Explanation.
Harper, Lee T.; Turner, Thomas A.; and Warrior, Nicholas A., "A Random Fibre Network Model for Predicting the Stochastic Effects of Discontinuous Fibre Composites," 16th International Conference on Composite Materials, Jul. 13, 2007, pp. 1-10, sufficiency disclosure and enlarged figures.
Pimenta, Soraia and Pinho, Silvestre T., "The influence of micromechanical properties and reinforcement architecture on the mechanical response of recycled composites," Composites: Part A 56 (2014) 213-225, enlarged figures.
Aug. 7, 2015—(EP) Third Party Observations—App 20130825264.
Jan. 10, 2019—(IN) Office Action—App 7063/DELNP/2014.

* cited by examiner

RANDOM MAT AND FIBER-REINFORCED COMPOSITE MATERIAL SHAPED PRODUCT

CROSS REFERENCE TO RELATED APPLICATIONS

This is a U.S. National Phase Application under 35 U.S.C. § 371 of International Application No. PCT/JP2013/070603, filed Jul. 30, 2013, which claims priority to Japanese Application 2012-171142 filed Aug. 1, 2012, and which was published Under PCT Article 21(2), the entire contents of which are incorporated herein by reference.

TECHNICAL FIELD

The present invention relates to a random mat used as an intermediate material of a fiber-reinforced composite material shaped product including a thermoplastic resin as a matrix, and a fiber-reinforced composite material shaped product obtained therefrom.

BACKGROUND ART

As a fiber-reinforced composite material in which a carbon fiber, an aramid fiber, a glass fiber, or the like is used as a reinforcing fiber, an isotropic random mat has been used due to formability or convenience of processing. The random mat may be obtained by a spray-up method (dry method) of simultaneously spraying a cut reinforcing fiber body or a thermosetting resin on a mold, a papermaking method (wet method) by adding a cut reinforcing fiber to a slurry containing a binder in advance, or the like.

As a mean for improving mechanical properties of a composite material, increasing a volume content ratio Vf of reinforcing fibers is known, but in the case of a random mat in which cut fibers are used, it is difficult to increase the volume content ratio of reinforcing fibers due to presence of fibers of three-dimensional direction, a lot of entanglements of fibers, and the like. Further, in the case of using the random mat, since the fibers are discontinuous in comparison with a case of using a continuous fiber, it is difficult to sufficiently develop strength of the reinforcing fibers, and a strength development ratio of the reinforcing fibers after forming a shaped product becomes 50% or less with respect to a theoretical value. In Non-patent Document 1, a composite material made from a random mat of a carbon fiber in which a thermosetting resin is used as a matrix is exemplified. The strength development ratio of the composite material is about 44% with respect to the theoretical value.

Further, a composite material in which a thermoplastic resin is used as a matrix in the related art was obtained by heating and pressurizing, by using an autoclave for 2 hours or more, an intermediate material called a prepreg, in which a thermosetting resin is impregnated into a reinforcing fiber base material in advance. Recently, an RTM method where a reinforcing fiber base material into which a thermosetting resin is not impregnated is set in a mold and then the thermosetting resin is cast therein has been proposed. The RTM method achieves that a molding time is largely reduced, but even in the case of using the RTM method, 10 minutes or more is required until one component is molded.

Accordingly, a composite in which the thermoplastic resin is used instead of the thermosetting resin as a matrix has been paid attention.

A thermoplastic stamping molding TP-SMC using a thermoplastic resin as a matrix (Patent Document 1) is a method in which chopped fibers in which the thermoplastic resin is impregnated in advance are heated at a melting point or more, the heated fibers is put into a part of a mold, the mold is immediately tightened, and then the fibers and the resin are allowed to flow in the mold to obtain a product shape and are cooled to mold a shaped product. In this method, the molding may be performed at a short time of about 1 minute by using the fibers into which the resin is impregnated in advance. The method is a method using a molding material called an SMC or a stampable sheet, and in the thermoplastic stamping molding, there are problems in that since the fibers and the resin are allowed to flow in the mold, a thin-walled product may not be made, and since an alignment of fibers are disordered, control thereof is difficult.

Further, in Patent Document 2, fibers in a fiber assembly are continuously distributed in a range of 1 mm to 15 mm of fiber lengths, short fibers are aggregated while being randomly mixed to prevent the fibers from partially forming aggregation-unevenness and to obtain the fiber assembly which is uniform and has excellent isotropy. However, in the method, there is a problem in that the short fibers are oriented in a thickness direction as well.

CITATION LIST

Patent Document

Patent Document 1: Japanese Patent No. 4161409
Patent Document 2: Japanese Patent Application Laid-Open No. 5-9853

Non-Patent Document

Non-Patent Document 1: Composites Part A 38 (2007) p. 755 to 770

SUMMARY OF INVENTION

Problems to be Solved by Invention

However, in the related art, a fiber-reinforced composite material shaped product having isotropy, excellent tensile strength, and high tensile modulus is not studied. In order to solve many problems in the related art, an object of the present invention provides a fiber-reinforced composite material shaped product having isotropy and excellent mechanical strength and a random mat used as an intermediate material thereof. Particularly, an object of the present invention provides a fiber-reinforced composite material shaped product having high volume content ratio of the reinforcing fibers included in the fiber-reinforced composite material shaped product, and the fiber-reinforced composite material shaped product having excellent tensile modulus.

Solution to Problem

Inventors find out providing a fiber-reinforced composite material shaped product having excellent mechanical strength, excellent isotropy, and high mechanical strength, particularly tensile modulus, from a random mat including a thermoplastic resin and reinforcing fibers which have a predetermined weight-average fiber width, an average fiber width dispersion ratio, and a discontinuous weight-average fiber thickness.

Further, the inventors find out that in the random mat, partial aggregation unevenness of the reinforcing fibers may be prevented from occurring by mixing reinforcing fibers having different large and small sizes, and in the random mat configured by only reinforcing fibers with a low diameter such as a single fiber form, by alignment in a thickness direction and entanglements of the fibers, the mat may be prevented from being bulky. In addition, by using the random mat including the reinforcing fibers having different large and small sizes, the inventors find out providing the fiber-reinforced composite material shaped product having higher volume content ratio of reinforcing fibers and more excellent mechanical strength to complete the present invention.

That is, the present invention is a random mat including reinforcing fibers having an average fiber length of 3 to 100 mm and a thermoplastic resin, in which the reinforcing fibers satisfy the followings i) to iii), and a fiber-reinforced composite material shaped product obtained by molding the same.

i) A weight-average fiber width (Ww) of the reinforcing fibers satisfies the following Equation (1).

$$0.03 \text{ mm} < (Ww) < 5.0 \text{ mm} \quad (1)$$

ii) An average fiber width dispersion ratio (Ww/Wn) defined as a ratio of the weight-average fiber width (Ww) to a number-average fiber width (Wn) for the reinforcing fibers is 1.8 or more and 20.0 or less.

iii) A weight-average fiber thickness of the reinforcing fibers is smaller than the weight-average fiber width (Ww).

Advantageous Effects of Invention

According to the present invention, in the random mat including the thermoplastic resin and the reinforcing fibers, the included reinforcing fibers have a predetermined fiber width distribution to increase a filling property of the reinforcing fibers and have excellent mechanical strength. Further, in in-plane directions, the reinforcing fibers are not aligned in a predetermined direction, but isotropic.

Accordingly, since the fiber-reinforced composite material shaped product obtained from the random mat of the present invention has excellent mechanical strength, excellent isotropy, and high mechanical strength, particularly, tensile modulus, the fiber-reinforced composite material shaped product may be used in various kinds of constituent members, for example, an inner plate, an outer plate, and constituent members of a vehicle, various kinds of electric products, a frame or a case of a machine, or the like.

DESCRIPTION OF EMBODIMENTS

Figure 1:
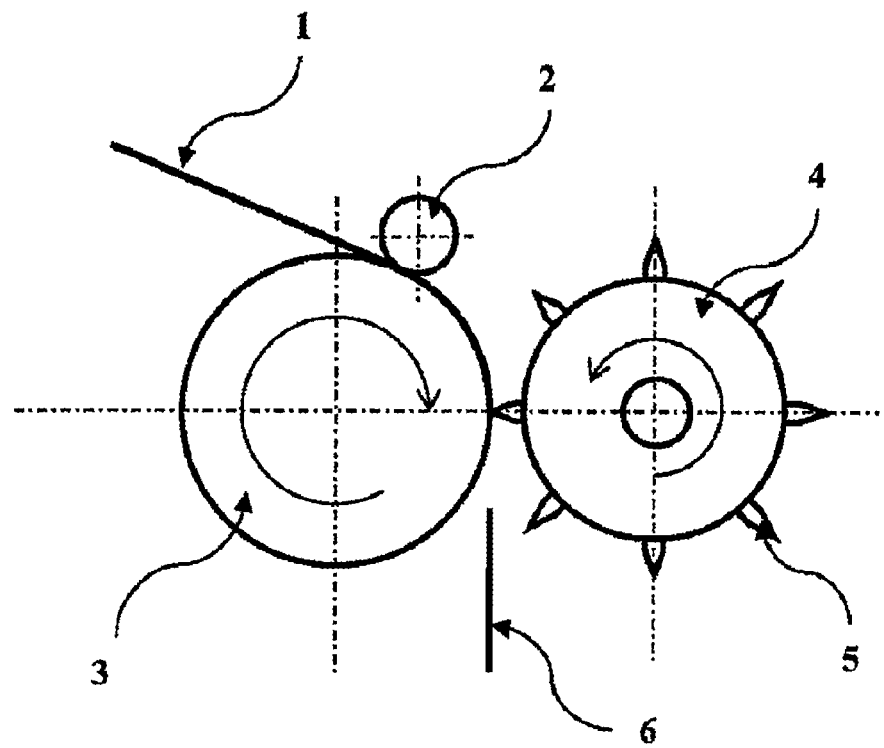
FIG. 1 is a schematic diagram of an example of a cutting process using a rotary cutter.

Hereinafter, embodiments of the present invention will be described in sequence. In disclosure for the present invention, a weight means a mass.

The present invention relates to a random mat including reinforcing fibers having an average fiber length of 3 to 100 mm and a thermoplastic resin, in which the reinforcing fiber satisfies the followings i) to iii).

i) A weight-average fiber width (Ww) of the reinforcing fiber satisfies the following Equation (1).

$$0.03 \text{ mm} < Ww < 5.0 \text{ mm} \quad (1)$$

ii) An average fiber width dispersion ratio (Ww/Wn) defined as a ratio of the weight-average fiber width Ww to a number-average fiber width (Wn) for the reinforcing fiber is 1.8 or more and 20.0 or less.

iii) A weight-average fiber thickness of the reinforcing fibers is smaller than the weight-average fiber width (Ww).

The weight-average fiber width (Ww) of the reinforcing fibers included in the random mat of the present invention may be obtained by the following Equation (5) from a width (hereinafter, also referred to as a fiber width or $W_i$) and a weight (hereinafter, also referred to as a fiber weight or $w_i$) thereof and a total weight w of extracted reinforcing fibers, with respect to each of reinforcing fibers having a sufficient number extracted from the random mat (preferably 200 to 1000 extracted from the random mat of 100 mm×100 mm, and more preferably 300 to 1,000, for example, 300).

$$Ww = \Sigma(W_i \times w_i/w) \quad (5)$$

In Equation (5), i is a natural number from 1 to the number of reinforcing fibers extracted from the random mat.

With respect to the random mat of the present invention, as shown in Equation (1), the weight-average fiber width (Ww) of the reinforcing fibers is larger than 0.03 mm and smaller than 5.0 mm, preferably larger than 0.03 mm and smaller than 4.0 mm, preferably larger than 0.1 mm and smaller than 3.0 mm, that is, represented by the following Equation (2).

$$0.1 \text{ mm} < Ww < 3.0 \text{ m} \quad (2)$$

It is more preferably larger than 0.2 mm and smaller than 2.4 mm, and particularly preferably larger than 0.3 mm and smaller than 2.0 mm. When the weight-average fiber width (Ww) of the reinforcing fibers is 0.03 mm or less, it may be difficult to control the fiber width dispersion ratio, and when the weight-average fiber width (Ww) of the reinforcing fibers is 5.0 mm or more, there are problems in that filling property of the reinforcing fibers in the random mat may be detracted, and the volume content ratio of reinforcing fibers or the mechanical strength of the shaped product obtained from the random mat may be insufficient.

In the random mat of the present invention, an average fiber width dispersion ratio (Ww/Wn) defined as a ratio of the weight-average fiber width (Ww) to a number-average fiber width (Wn), for the included reinforcing fibers, is 1.8 or more and 20.0 or less, and preferably 1.8 or more and 10.0 or less. The lower limit of the (Ww/Wn) is preferably larger than 2.0, for example, 2.01 or more. The (Ww/Wn) is preferably more than 2.0 and 15.0 or less, more preferably more than 2.0 and 12.0 or less, much more preferably more than 2.0 and 10.0 or less, particularly preferably 2.0 and 8.0 or less, and most preferably more than 2.0 and 6.0 or less. It is preferred that the average fiber width dispersion ratio (Ww/Wn) (in the present invention, simply abbreviated as a dispersion ratio) is 1.8 or more because it is not liable to form a gap between the reinforcing fibers, and the volume content ratio of reinforcing fibers is easily increased. It is not preferred that the (Ww/Wn) is more than 20.0 because it is difficult to control the dispersion ratio.

Here, the number-average fiber width (Wn) is calculated by the following Equation (4), after extracting a sufficient number (I) of reinforcing fibers from the random mat in the aforementioned order of the weight-average fiber width (Ww) and measuring a fiber width $W_i$ of each reinforcing fiber.

$$Wn = \Sigma W_i / I \qquad (4)$$

In the reinforcing fibers included in the random mat of the present invention, the weight-average fiber thickness is smaller than the weight-average fiber width (Ww), and the weight-average fiber thickness is preferably ⅕ or less of the weight-average fiber width (Ww), more preferably ⅐ or less, much more preferably 1/10 or less, much more preferably 1/20, and particularly preferably 1/50 or less. When the weight-average fiber thickness of the reinforcing fibers is the same as the weight-average fiber width (Ww), the fibers are oriented in not only an in-plane directions but also a thickness direction, and as a result, it is concerned that a problem in that it is difficult to increase the volume content ratio of reinforcing fibers due to entanglements of the reinforcing fibers is caused.

In the present invention, the short length is referred to as a 'thickness' of lengths of two directions except for a longitudinal direction of the reinforcing fiber, and the other length is referred to as a 'width'. When dimensions of two directions which are orthogonal to each other on a cross section in the vertical direction to the longitudinal direction of the reinforcing fiber are the same as each other, an arbitrary direction is referred to as a width of the reinforcing fiber, and the other direction is referred to as a thickness of the reinforcing fiber.

The weight-average fiber thickness of the reinforcing fibers included in the random mat of the present invention is preferably 0.01 mm or more and 0.30 mm or less, more preferably 0.02 mm or more and 0.20 mm or less, much more preferably 0.03 mm or more and 0.15 mm or less, and particularly preferably 0.03 mm or more and 0.10 mm or less. In terms of impregnation of the thermoplastic resin which is to be a matrix, the weight-average fiber thickness of the reinforcing fibers is preferably 0.30 mm or less. A value of 0.01 mm or more which is the lower limit of the weight-average fiber thickness of the reinforcing fibers is not particularly strict.

Meanwhile, the weight-average fiber thickness t of the reinforcing fibers may be obtained by the following Equation (7) after operating the procedure as described in the weight-average fiber width (Ww) and measuring a fiber thickness $t_i$ and a fiber weight $w_i$ of all the extracted reinforcing fibers and a total weight w of the extracted reinforcing fibers.

$$T = \Sigma(t_i \times w_i / w) \qquad (7)$$

In a plane of the random mat of the present invention, the reinforcing fibers are not aligned in a specific direction, but arranged to be dispersed in random directions. The random mat of the present invention is an in-plane isotropic intermediate material. In the shaped product obtained by processing the random mat of the present invention, the isotropic property of the reinforcing fibers in the random mat is maintained. The isotropic properties of the random mat and the shaped product from the random mat may be evaluated quantitatively by calculating a ratio of tensile moduli in two directions which are orthogonal to each other after obtaining the shaped product from the random mat. When a ratio obtained by dividing the larger value by the smaller value of tensile modulus values in the two directions is not more than 2 in the shaped product obtained from the random mat, it is considered as isotropic property. When the ratio is not more than 1.3, it is considered that the isotropic property is excellent.

As described above, the random mat of the present invention is constituted by the reinforcing fibers having the specific weight-average fiber width, the average fiber width dispersion ratio, and the weight-average fiber thickness and the thermoplastic resin. The random mat of the present invention preferably includes the thermoplastic resin and a reinforcing fiber mat constituted by the reinforcing fibers. The reinforcing fiber mat of the present invention is a planar body (mat type) constituted by discontinuous reinforcing fibers without including a thermoplastic resin as a matrix. In the reinforcing fiber mat according to the present invention, the reinforcing fibers may include a sizing agent, or a small amount of a binder when forming the mat. Further, it is preferred that the reinforcing fibers are oriented in random directions in in-plane directions, and the mat has substantially the same property vertical and horizontal directions in the in-plane directions.

The kind of the reinforcing fiber is not particularly limited, and may be a single or a combination of two or more kinds.

In the random mat of the present invention, as an embodiment where the reinforcing fiber mat includes the thermoplastic resin, a powder, fibrous, or lump type thermoplastic resin may be included in the reinforcing fiber mat, the thermoplastic resin as a matrix may hold the reinforcing fiber mat, or a sheet or film type thermoplastic resin may be included in the reinforcing fiber mat or layered in the reinforcing fiber mat. The thermoplastic resin of the random mat may be in a molten state. Further, it is needless to say that when a weight-average fiber width (Ww), a dispersion ratio of the fiber width (Ww/Wn), and the like, for the reinforcing fiber mat included in the random mat of the present invention are calculated, the calculated values may be deemed to as those of the random mat.

The random mat of the present invention may be directly used as a preform to obtain a fiber-reinforced material shaped product (hereinafter, simply referred to as a shaped product) which is a final form. The random mat of the present invention may be used to obtain the shaped product which is the final form after impregnating the thermoplastic resin through heating or the like to form a prepreg. The random mat of the present invention includes the prepreg into which the thermoplastic resin is impregnated.

Here, the shaped product which is the final form means a shaped product in a form where a product obtained by pressurizing and heating the random mat or a molded plate thereof is not additionally heated or pressurized (additionally molded) to melt the thermoplastic resin as a matrix and to change a shape or a thickness of the obtained product. Accordingly, when the product obtained by pressurizing and heating the random mat or the like is cut to form another shape, polished to be thin, and coated with a resin or the like to be thick, the pressurizing and heating is not performed, and as a result, the obtained product is the shaped product which is the final form. Further, use of heat as a cutting or processing means does not correspond to the heating described herein.

Further, in a case where the random mat to which a thermoplastic resin in a molten state is supplied is molded, when the supplied thermoplastic resin is molded in the molten state, for example, the shaped product may be obtained by molding including pressurizing only.

The random mat of the present invention may be used for molding as it is as a preform, and may be used for molding after being formed as a molded plate, and may select various fiber areal weights according to a desired molding. The fiber areal weight of the reinforcing fibers in the random mat is preferably 25 to 10,000 g/m², more preferably 50 to 4,000 g/m², much more preferably 600 g/m² to 3,000 g/m², and much more preferably 600 g/m² to 2,200 g/m².

In the random mat of the present invention, a reinforcing fiber width distribution (hereinafter, simply abbreviated as a fiber width distribution) represented by a graph, or the like, in which a fiber width of the included reinforcing fibers is a horizontal axis, and a fiber weight fraction of the reinforcing fiber of each fiber width is a vertical axis, preferably has one or more peaks, and more preferably has at least two peaks. Here, the peak is not limited to an acute shape, and may have a mountain shape having a wide half width, or a trapezoidal shape. Further, the peak may have a symmetrical shape or an asymmetrical shape.

When the reinforcing fiber width distribution of the reinforcing fibers included in the random mat of the present invention has preferably at least two peaks, gaps between the reinforcing fibers in the random mat are further smaller, and thus a filling property may be enhanced.

When the reinforcing fiber width distribution has at least two peaks, the random mat may be obtained by using reinforcing fibers slit by at least two different kinds of distances.

As the at least two peaks of the fiber width distribution of the reinforcing fibers included in the random mat of the present invention, it is preferred that one peak is in a range of 0.01 mm or more and less than 0.50 mm of the fiber width, and the other peak is in a range of 0.50 mm or more and 2.00 mm or less of the fiber width. In addition, it is preferred that one peak is in a range of 0.10 mm or more and less than 1.00 mm of the fiber width, and the other peak is in a range of 1.00 mm or more and 5.00 mm or less of the fiber width. Further, the random mat having the peaks in the ranges and the fiber weight fraction of the fiber width in a small range being larger than the fiber weight fraction of the fiber width in a large range is further preferably.

In the case where the fiber width distribution has three or more peaks, when two peaks thereof fall within the range, the remaining peak may be out of the range or may be in the range.

[Reinforcing Fiber]

The reinforcing fibers included in the random mat are discontinuous and is characterized by including a longer reinforcing fiber at a certain level to develop a reinforcing function. The fiber length is expressed as an average fiber length calculated by measuring fiber lengths of the reinforcing fibers in the obtained random mat. The method of measuring the average fiber length may include a method of calculating an average by measuring a fiber length of 100 fibers which are randomly extracted by 1 mm unit with a vernier caliper or the like.

The average fiber length of the reinforcing fibers in the random mat of the present invention is 3 mm or more and 100 mm or less, preferably 4 mm or more and 50 mm or less, more preferably 5 mm or more and 30 mm or less, and much more preferably 5 mm or more and 20 mm or less. In order to increase the filling property of reinforcing fibers in the random mat, the fiber length of the reinforcing fibers is preferably closer to the fiber width, and a ratio of the average fiber length and the weight-average fiber width (Ww) is preferably 50/1 or less, more preferably 30/1 or less, and much more preferably 10/1 or less.

The distribution of the fiber lengths may be either a single or a combination of two kinds or more.

In a preferable method of cutting reinforcing fibers to be described below, in the case of forming a random mat by cutting the reinforcing fibers with a fixed length, the average fiber length becomes the same as the cut fiber length.

The reinforcing fibers are preferably at least one kind selected from the group consisting of carbon fibers, aramid fibers, and glass fibers. As the reinforcing fibers constituting the random mat, the carbon fibers are preferably in that the carbon fibers may provide a lightweight composite material with excellent strength. As a carbon fiber, a polyacrylonitrile-based carbon fiber (hereinafter, abbreviated as PAN-based carbon fiber), a petroleum pitch-based carbon fiber, a coal pitch-based carbon fiber, a rayon-based carbon fiber, a cellulose-based carbon fiber, a lignin-based carbon fiber, a phenol-based carbon fiber, a vapor growth-based carbon fiber, and the like, are generally known, and the present invention may properly use any carbon fibers thereof. Particularly, the PAN-based carbon fiber is preferable, and may be used either alone or in combination of a plurality of kinds. The reinforcing fibers used in the random mat of the present invention may be only the carbon fibers or include the glass fibers or the aramid fibers in order to impart impact resistance. In the case of the carbon fibers, an average fiber diameter is preferably 1 to 50 µm, more preferably 3 to 12 µm, much more preferably 5 to 9 µm, and most preferably 5 to 7 µm. It is preferable that carbon fibers with a sizing agent are used, and preferably the sizing agent may be more than 0 to 10 parts by weight based on 100 parts by weight of the carbon fibers.

The reinforcing fibers in the present invention may be preferably an opened state as a single filament, a fiber bundle having a plurality of single filaments, or in combination of the single filament and the fiber bundle.

[Matrix Resin]

The thermoplastic resin is a matrix resin included in the random mat of the present invention. The kind of thermoplastic resin may include one or more kinds selected from the group consisting of, for example, a vinyl chloride resin, a vinylidene chloride resin, a vinyl acetate resin, a polyvinyl alcohol resin, a polystyrene resin, an acrylonitrile-styrene resin (AS resin), an acrylonitrile butadiene styrene resin (ABS resin), an acrylic resin, a methacrylic resin, a polyethylene resin, a polypropylene resin, a polyamide 6 resin, a polyamide 11 resin, a polyamide 12 resin, a polyamide 46 resin, a polyamide 66 resin, a polyamide 610 resin, a polyacetal resin, a polycarbonate resin, a polyethylene terephthalate resin, a polyethylene naphthalate resin, a polybutylene naphthalate resin, a polybutylene terephthalate resin, a polyarylate resin, a polyphenylene ether resin, a polyphenylene sulfide resin, a polysulfone resin, a polyether sulfone resin, a polyether ether ketone resin, a polylactic acid resin, and the like. In the present invention, the thermoplastic resin may be used alone, in combination of a plurality of kinds, or as a copolymer or a modified polymer.

The content of the matrix resin is preferably 10 to 800 parts of weight, more preferably 20 to 300 parts of weight, much more preferably 20 to 200 parts of weight, much more preferably 30 to 150 parts of weight, and particularly preferably 50 to 100 parts of weight, based on 100 parts of weight of the reinforcing fibers.

Further, a relationship in amount between the reinforcing fibers and the thermoplastic resin may be referred to by a volume content ratio of reinforcing fibers (hereinafter, abbreviated as Vf) defined by the following Equation.

Volume content ratio of reinforcing fibers (Vol %)=100×[volume of reinforcing fibers/(volume of reinforcing fibers+volume of thermoplastic resin)]

The volume content ratio Vf of reinforcing fibers and the content of the thermoplastic resin represented by parts of weight based on 100 parts of weight of the reinforcing fibers are converted by using the density of the reinforcing fibers and the density of the thermoplastic resin.

Further, in the range without damaging an object of the present invention, additives, such as various fibrous or non-fibrous fillers of organic fibers or inorganic fibers, flame retardants, anti-UV agents, pigments, release agents, softeners, plasticizers, and surfactants, may be included in the random mat of the present invention.

[Fiber-Reinforced Composite Material Shaped Product]

Since the reinforcing fibers constituting the random mat have the above characteristics, the random mat of the present invention has an advantage which is high formality. Thus, the random mat of the present invention may be used as an intermediate material for obtaining the fiber-reinforced composite material shaped product.

That is, the present invention includes an invention of a fiber-reinforced composite material shaped product obtained from the random mat.

The fiber-reinforced composite material shaped product of the present invention includes reinforcing fibers having an average fiber length of 3 to 100 mm and a thermoplastic resin, and it is preferable that the reinforcing fibers may satisfy the following i) to iii).

i) A weight average fiber width (Ww) of the reinforcing fibers satisfies the following Equation (1).

$$0.03 \text{ mm} < Ww < 5.0 \text{ mm} \quad (1)$$

ii) A dispersion ratio (Ww/Wn) defined as a ratio of the weight average fiber width (Ww) to a number average fiber width (Wn) for the reinforcing fiber is 1.8 or more and 20.0 or less.

iii) A weight-average fiber thickness of the reinforcing fibers is smaller than the weight-average fiber width (Ww).

The thickness of the fiber-reinforced composite material shaped product of the present invention may be adjusted in a proper range by controlling a fiber areal weight and an amount of the thermoplastic resin.

A kind of reinforcing fibers constituting the fiber-reinforced composite material shaped product of the present invention is not particularly limited, and may preferably include the examples described in the reinforcing fibers in the random mat.

A kind of resin constituting the fiber-reinforced composite material shaped product of the present invention is not particularly limited, and may preferably include the examples described in the matrix resin in the random mat.

The content of the thermoplastic resin of the fiber-reinforced composite material shaped product of the present invention is preferably 10 to 800 parts of weight, more preferably 20 to 300 parts of weight, much more preferably 20 to 200 parts of weight, much more preferably 30 to 150 parts of weight, and particularly preferably 50 to 100 parts of weight, based on 100 parts of weight of the reinforcing fibers, as described above based on the content of the thermoplastic resin in the random mat.

A shape of the fiber-reinforced composite material shaped product of the present invention is not particularly limited. The shape may be, for example, a sheet shape and a plate shape, and may have a curved portion, and a cross section may be a shape having an standing plane such as a T-lettered shape, an L-lettered shape, an U-lettered shape, and a hat shape, and may be a 3D shape including these shapes.

The fiber-reinforced composite material shaped product of the present invention may have various kinds of thicknesses, for example, 0.2 to 100 mm, but even though the fiber-reinforced composite material shaped product is a thinner-walled shaped product, a property or an appearance may be very well. In detail, the thickness as a molding plate may be 0.2 mm to 2.0 mm (more precisely, a thickness at 25° C. if an extremely strict measurement is necessary). The fiber areal weight of the reinforcing fibers in the fiber-reinforced composite material shaped product is preferably 25 to 10,000 g/m$^2$, more preferably 50 to 4,000 g/m$^2$, more preferably 600 g/m$^2$ to 3,000 g/m$^2$, and much more preferably 600 g/m$^2$ to 2,200 g/m$^2$.

The present invention includes a laminate in which at least one kind of fiber-reinforced composite material shaped product of the present invention is used in a core or a skin layer. The laminate of the present invention may further include at least one kind of unidirectional fiber-reinforced composite material in which continuous reinforcing fibers are unidirectionally arranged in parallel, as the core or the skin layer. The laminate of the present invention may further include at least one kind of fiber-reinforced composite material shaped product (hereinafter, referred to as another fiber-reinforced composite material shaped product) other than the fiber-reinforced composite material shaped product of the present invention or the unidirectional fiber-reinforced composite material, as the core or the skin layer. The laminate of the present invention may further include at least one kind of resin in which reinforcing fibers are not included, as the core or the skin layer.

The matrix resin of the unidirectional fiber-reinforced composite material or another fiber-reinforced composite material shaped product, and the resin in which reinforcing fibers are not included may be thermosetting resins or thermoplastic resins.

[Method for Manufacturing Random Mat]

A method for manufacturing the random mat of the present invention is preferably a method including the following processes 1 to 4.

1. A process of cutting the reinforcing fibers (cutting process)

2. A process of introducing the cut reinforcing fibers into a tube, transporting the introduced reinforcing fiber by air, and spraying them (spray process)

3. A process of fixing the sprayed reinforcing fibers to obtain a reinforcing fiber mat (fixing process)

4. A process of adding a thermoplastic resin to the reinforcing fiber mat to obtain a random mat (thermoplastic resin adding process)

<Cutting Process>

Figure 2:
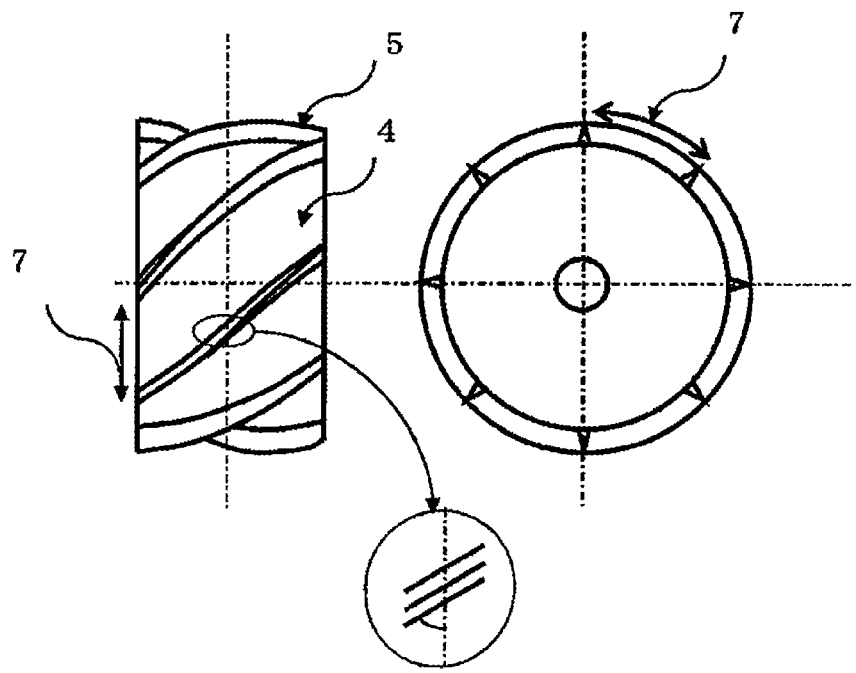
FIG. 2 is a schematic diagram illustrating a front and a cross section in an example of a preferable rotary separating cutter.

The process of cutting the reinforcing fibers will be described. As the reinforcing fibers to be cut, a form in which long-fibered single fibers are bundled, so called a strand is easily obtained or handled to be preferable. The cutting method of the reinforcing fibers is a process of cutting the reinforcing fibers by using a knife such as a rotary cutter. An example of the cutting process using the rotary cutter is illustrated in FIG. 1. An angle of the knife for continuously cutting the reinforcing fibers is not particularly limited, and the knife may have a blade of 90 degrees or a certain angle relative to a general fiber or a blade arranged in a spiral form. An example of a rotary cutter having a spiral knife is illustrated in FIG. 2.

The random mat of the present invention is characterized in that the reinforcing fibers have a specific fiber width distribution as described above. That is, gaps between the reinforcing fibers are smaller by including fibers having different fiber widths in the random mat, and thereby increasing the filling property. The distribution of the fiber widths is not particularly limited, and a peak shape thereof may be a single or in plural.

In order to obtain a desired fiber width and a dispersion ratio of the reinforcing fibers, a size of the reinforcing fibers provided in the cutting process such as a fiber width or a fiber thickness may be controlled by a widening method and a separating method to be described below. Further, the cut reinforcing fibers are preferably opened by compressed air and the like to be finer reinforcing fibers.

Further, by using a plurality of reinforcing fibers, an average fiber width or a dispersion ratio of the random mat may be controlled, and in the cutting process or the spray process to be described below, the average fiber width or the dispersion ratio may be controlled preferably by combining reinforcing fibers having different fiber widths or fiber thicknesses.

The widening method of fibers is not particularly limited, and may include a method of pushing an expanded spreader such as a convex pin and the like to the fibers, a method of arching the fibers in a flowing direction of a wind by passing through an air flow in a cross direction to a processing direction of the fibers, a method of applying vibration, and the like. The widened reinforcing fibers may preferably become a desired fiber width by using a control roller for controlling the fiber width, installed at a rear end.

Figure 3:
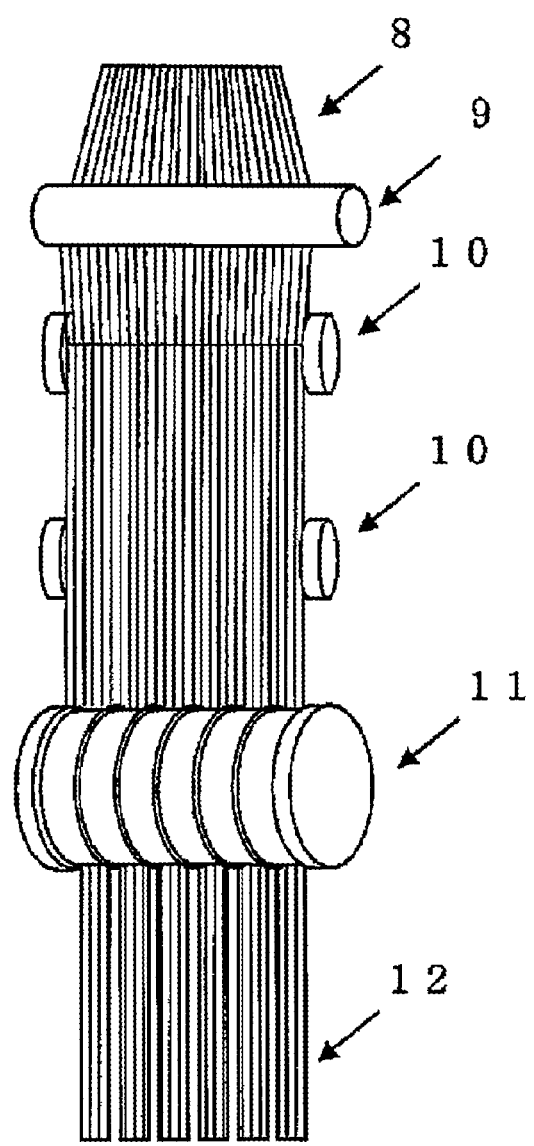
FIG. 3 is a schematic diagram of a preferable example of a widening and opening method of a fiber.

Further, in order to form the random mat of the present invention, the reinforcing fibers are widened as described above, and then the width of the reinforcing fibers may be separated to be smaller (see FIG. 3 as well).

The separating method of the fibers is not particularly limited, and for example, may include a method of using a slitter or the like in order for a strand to be thin bundles. In the case of separating the strand by using the slitter, a desired fiber width may be properly obtained by controlling a slit interval. Further, a slit blade is capable of preferably controlling a fiber width by passing fibers with a specific fiber width through a knife-type slit blade to be separated or through a comb-type slit to be selected. Further, a desired average fiber number of reinforcing fibers may be easily obtained by selecting a sizing agent of the reinforcing fibers and separating the reinforcing fibers.

As such, the reinforcing fibers may be controlled with a small or similar fiber width through the fiber widening and the fiber separating. Therefore, it is possible to obtain the random mat of which expression of the reinforcing function of the reinforcing fibers included in the random mat is excellent, and homogeneity is improved, non-uniformity in thickness of the reinforcing fiber mat is small, and mechanical strength is excellent.

<Spray Process>

Subsequently, a spray process is performed by introducing the cut reinforcing fibers into a tapered tube at a downstream side from the cutter. A method of transporting the reinforcing fibers to the tapered tube is not particularly limited, but it is preferable that a suction wind velocity is allowed to be generated in the tapered tube and thus the reinforcing fiber may be transported into the tapered tube by air. During the cutting process, when a plurality of reinforcing fibers is separately cut, the reinforcing fibers may be preferably mixed in the tapered tube by mixing them in the tapered tube.

Further, during the spray process, compressed air is directly blown to the reinforcing fibers to properly widen the distribution of the reinforcing fiber widths. An area of the distribution may be controlled by pressure of the blown compressed air.

The transported reinforcing fibers may be preferably sprayed on a permeable sheet installed below a spraying apparatus.

Further, the transported reinforcing fibers may be preferably sprayed on a movable permeable sheet having a suction mechanism, even for the following fixing process.

Further, during the spray process, a fibrous or a powder-type thermoplastic resin is sprayed on the sheet together with the cut reinforcing fiber at the same time to appropriately obtain the random mat including the reinforcing fibers and the thermoplastic resin.

<Fixing Process>

Subsequently, the sprayed reinforcing fibers are fixed to obtain the reinforcing fiber mat. In detail, the method of fixing the sprayed reinforcing fibers by suctioning air from a lower portion of the permeable sheet to obtain the reinforcing fiber mat is preferable. Even in the case of spraying the reinforcing fibers and the fibrous or the powder-type thermoplastic resin at the same time, the fibrous or powder-type thermoplastic resin is fixed to be accompanied with the reinforcing fibers. Further, the fixing process may be continuously performed with the process of spraying the reinforcing fibers and the like during the spray process.

<Thermoplastic Resin Adding Process>

The thermoplastic resin adding process may be simultaneously performed with the above 1 to 3 processes, and for example, during the spray process as described above, the powder-type thermoplastic resin may be sprayed. When the reinforcing fiber mat is formed without adding the thermoplastic resin during the above processes 1 to 3, the random mat of the present invention may be obtained by mounting or layering a sheet-type or a film-type thermoplastic resin on the reinforcing fiber mat, and in this case, the sheet-type or the film-type thermoplastic resin may be in a molten state.

Further, during the spray process, on the random mat obtained by spraying the powder-type thermoplastic resin, the sheet-type, the film-type, or the powder-type thermoplastic resin may also be mounted or layered as described above.

[Preparing of Fiber-Reinforced Composite Material Shaped Product]

The random mat of the present invention may be molded to obtain the fiber-reinforced composite material shaped product. The method of obtaining the fiber-reinforced composite material shaped product may include a method of obtaining the fiber-reinforced composite material shaped product by heating and pressurizing the random mat obtained as described above by using a press or the like. The method of obtaining the fiber-reinforced composite material shaped product of the present invention is not particularly limited, but the shaped product may be appropriately obtained by vacuum molding, hydraulic molding, or molding by a hot press, a cold press, or the like. The fiber-reinforced composite material shaped product of the present invention may be appropriately obtained by cold press molding in which the random mat is heated up to a melting point or more or a glass transition temperature or more of the contained thermoplastic resin, and inserted into molds whose temperature are maintained at a temperature of the melting point or less or the glass transition temperature or less to obtain a shape.

In the case of molding the random mat, it is preferred that the random mat is heated at a melting point or more in the case where a thermoplastic resin which is a matrix is crystalline, or at a temperature of a glass transition point or more in the case where the thermoplastic resin is amorphous. More preferably, the heated temperature is a temperature of a decomposition point or less of the thermoplastic resin. A pressurizing medium may be controlled to the melting point or more, or the glass transition point or more, of the thermoplastic resin which is a matrix, and controlled at the melting point or less or the glass transition point or less. Further, during the molding, the thermoplastic resin may be appropriately added to obtain the fiber-reinforced composite material shaped product having a different thickness depending on an object. The thermoplastic resin to be added is not particularly defined, and a detailed example may be the thermoplastic resin described in the matrix resin. Further, a form of the resin may use a molten resin, or a fibrous, a powder-type, or a film-type resin.

The random mat of the present invention may be used as it is as a preform, and may be formed as a molding plate to form a shaped product which is the final form.

EXAMPLES

Examples are illustrated below, but the present invention is not limited thereto. Particularly, unless mentioned, units of the fiber length, the fiber width, and the fiber thickness of the reinforcing fibers or a sample thereof are mm, and a unit of weight is g. Further, the densities of the carbon fibers or the thermoplastic resin used in the following Examples and Comparative Example are as follows.

PAN-based carbon fiber "Tenax" (registered trademark) STS40-24K: 1.75 g/cm$^3$

PAN-based carbon fiber "Tenax" (registered trademark) UMS40-24K: 1.79 g/cm$^3$

PAN-based carbon fiber "Tenax" (registered trademark) HTS40-12K: 1.76 g/cm$^3$

PAN-based carbon fiber "Tenax" (registered trademark) UTS50-24K: 1.79 g/cm$^3$

Polypropylene: 0.91 g/cm$^3$
Polyamide 6: 1.14 g/cm$^3$
Polycarbonate: 1.20 g/cm$^3$

[Method of Calculating Number-Average Fiber Width and Weight-Average Fiber Width of Reinforcing Fiber in Random Mat]

The random mat is cut into 100 mm×100 mm, and 300 reinforcing fibers are randomly extracted with tweezers. A fiber width $W_i$, a fiber weight $w_i$, and a fiber thickness $t_i$ for each of the extracted reinforcing fibers are measured and recorded. A vernier caliper which is measurable by 1/100 mm is used in a measurement of the fiber width and the fiber thickness, and a balance which is measurable by 1/100 mg is used in a measurement of the weight. Small size reinforcing fibers which are unmeasurable are collected to measure a weight thereof. Further, in the case of using two or more kinds of reinforcing fibers, the reinforcing fibers are divided every kind of reinforcing fibers, and each of the reinforcing fibers is measured and evaluated.

With respect to all the extracted fibers, the fiber width $W_i$ and the fiber weight $w_i$ are measured, and then the number-average fiber width (Wn) is calculated by the following Equation (4).

$$Wn=\Sigma W_i/I \quad (4)$$

I is the number of reinforcing fibers, and the fiber number is 300, except for a case of less than 300.

In addition, the weight-average fiber width (Ww) of the reinforcing fibers is calculated by the following Equation (5) from the total weight w of the reinforcing fibers.

$$Ww=\Sigma(W_i \times w_i/w) \quad (5)$$

Further, in the case where the reinforcing fibers and the thermoplastic resin are not separated from each other and thus the measurement is interrupted, after the thermoplastic resin is removed by heating at, for example, 500° C. for about 1 hour, the measurement is performed.

[Method of Calculating Dispersion Ratio (Ww/Wn) in Reinforcing Fibers]

The average fiber width dispersion ratio (Ww/Wn) is calculated by the following Equation (6) from the calculated number-average fiber width (Wn) and weight-average fiber width (Ww), of the obtained reinforcing fibers.

The average fiber width dispersion ratio (Ww/Wn)=Weight-average fiber width (Ww)/Number-average fiber width (Wn)    (6)

[Method of Checking a Peak Position of Reinforcing Fiber Width Distribution in Random Mat]

From the fiber width $W_i$ and the fiber weight $w_i$ calculated above, and the total weight w of the reinforcing fibers, a graph of a fiber width and a fiber weight fraction (%) is prepared, and in view of a shape of the obtained reinforcing fiber width distribution, positions of peaks of the fiber width distribution are checked.

Further, in the case of using two or more kinds of reinforcing fibers, a graph is prepared every kind of reinforcing fibers, and each of the reinforcing fibers is evaluated.

[Method of Calculating Weight-Average Fiber Thickness of Reinforcing Fibers in Random Mat]

With respect to all the extracted reinforcing fibers, after the fiber thickness $t_i$ and the fiber weight $w_i$ are measured, a weight-average fiber thickness t is calculated by the following Equation (7).

$$T=\Sigma(t_i \times w_i/w) \quad (7)$$

[Method of Calculating Number-Average Fiber Width and Weight-Average Fiber Width of Reinforcing Fibers in Fiber-Reinforced Composite Material Shaped Product]

The average fiber width of the reinforcing fibers of the fiber-reinforced composite material shaped product is calculated by extracting the fibers in the same order as the random mat to measure the fiber width $W_i$, the fiber weight $w_i$, and the like, after the composite material shaped product is cut into 100 mm×100 mm and the resin is removed by heating at 500° C. for about 1 hour in a furnace.

[Method of Calculating Average Fiber Length L in Reinforcing Fiber Mat or Random Mat]

100 reinforcing fibers are randomly extracted from the reinforcing fiber mat or the random mat by using a pair of tweezers, and each fiber length Li is measured by 1 mm by using a vernier caliper and recorded. Preferably the size during extraction may be in a sufficient large range with respect to the fiber length.

An average fiber length L is calculated from each obtained fiber length $L_i$ by the following Equation.

$$L=\Sigma L_i/100$$

Further, in the case where the reinforcing fibers and the thermoplastic resin are not separated from each other and thus the measurement is interrupted, after the thermoplastic resin is removed by heating at 500° C. for about 1 hour, the measurement is performed.

[Evaluation of Impregnation Degree of Thermoplastic Resin of Fiber-Reinforced Composite Material Shaped Product (Molding Plate)]

The impregnation degree of the fiber-reinforced composite material shaped product (molding plate) is evaluated by an ultrasonic inspection. The impregnation degree is evaluated by performing the inspection at an inspector frequency of 5 MHz and a scanning pitch of 2.0 mm×2.0 mm by an ultrasonic inspection imaging apparatus (KJTD Co., Ltd, SDS-WIN). In the evaluation, microscopic observation is performed at a partial cross section having strength in reflective wave of 90% or more, and then it is verified that there is no defect or pore. In the inspection, as an area ratio of a portion having high reflective wave strength (70% or more in the exemplary embodiment) is large, the inside of the molding plate is dense, and the impregnated degree of the thermoplastic resin in the molding plate is high. On the other hand, as the area ratio of a portion having low reflective wave strength (50% or less in the exemplary embodiment) is large, minute pore portions are present inside the molding plate, and there are many non-impregnation portions in the molding plate.

[Tensile Test]

A specimen is cut from the fiber-reinforced composite material shaped product (molding plate) by using a water jet, and tensile strength and tensile modulus are measured by using an universal tester manufactured by Instron Corporation with reference to JIS K 7164. A shape of the specimen is set as a 1B-based B type specimen. A distance between chucks is 115 mm, and a test velocity is 10 mm/min. Further, the specimens are respectively cut in an arbitrary direction (0° direction) of the shaped product and an orthogonal direction (90° direction) to the arbitrary direction, and then tensile strengths and tensile moduli in two directions are measured. Further, with respect to the tensile moduli, a ratio Eδ obtained by dividing the larger value by the smaller value is calculated.

Example 1

As a reinforcing fiber, PAN-based carbon fibers "Tenax" (registered trademark) STS40-24K strand manufacture by TOHO TENAX Co., Ltd. (fiber diameter of 7.0 μm, fiber width of 10 mm, and tensile strength of 4,000 MPa) were widened to have a width of 22 mm. Before the widened fibers were processed by a separation apparatus, the widened fibers passed through a roller having an inner width of 20 mm, and the fiber width was accurately controlled to be a width of 20 mm. The widened reinforcing fiber strand having the width of 20 mm was slit at an interval of 1.2 mm at a line speed of 10 m/sec and slit at an interval of 0.3 mm at a line speed of 30 m/sec by using a disk-shaped separation blade made of cemented carbide to be supplied to two sets of cutting apparatuses. The reinforcing fiber strand which was slit with two kinds of fiber widths was cut by using a rotary cutter made of cemented carbide in which two blades were formed at an interval of 12 mm as the cutting apparatus so that the fiber length was 12 mm. One tapered tube connected from the outlet side of the rotary cutter was arranged below the two rotary cutters. Compressed air was supplied to the tapered tube, each reinforcing fiber was introduced and transferred to the tapered tube at a suction wind velocity of 5 m/sec, and two reinforcing fibers were mixed in the tapered tube. Polypropylene (J-106G, manufactured by Prime Polymer Co., Ltd.) grinded and classified with a particle diameter of 500 μm, as a matrix resin, was supplied from a side of the tapered tube. Next, while a movable conveyer net was installed below the outlet of the tapered tube to perform suction by a blower below the net, the reinforcing fibers were supplied from the tapered tube to obtain the random mat of a fiber areal weight of 1,270 g/m². When the form of the reinforcing fibers in the random mat was observed, the fiber axes of the reinforcing fibers were almost parallel to a plane of the random mat, and the reinforcing fibers were randomly dispersed in the plane.

An average fiber length of the reinforcing fibers of the obtained random mat was 12 mm, and a weight-average fiber thickness was 0.06 mm. The weight-average fiber width (Ww) of the reinforcing fibers constituting the random mat is 0.51 mm, the number-average fiber width (Wn) was 0.25 mm, and the dispersion ratio (Ww/Wn) was 2.01. Further, the fiber width and the fiber weight fraction were represented by a graph, and when positions of peaks of the fiber width distribution were checked, the peaks were verified at 0.29 mm and 1.18 mm of the fiber width.

The obtained random mat was heated at 4.0 MPa for 10 minutes by a press apparatus heated at 220° C. to obtain a molding plate having a thickness 1.6 mm. When the ultrasonic inspection test was performed at the obtained molding plate, a portion where the reflective wave strength was 70% or more was observed as 80% or more.

The volume content ratio of the reinforcing fibers of the obtained molding plate was 45 Vol %, and as a result of evaluating a tensile characteristic based on JIS7164, tensile strength was 490 MPa, and tensile modulus was 36 GPa. Further, a ratio in tensile moduli of 0° direction and 90° direction was 1.04.

Example 2

As a reinforcing fiber, PAN-based carbon fibers "Tenax" (registered trademark) UMS40-24K strand manufactured by TOHO TENAX Co., Ltd. (fiber diameter of 4.8 μm, fiber width of 10 mm, and tensile strength of 4,600 MPa) were widened to have a width of 16 mm. Before the widened fibers were processed by a separation apparatus, the widened fibers passed through a roller having an inner width of 15 mm, and the fiber width was accurately controlled to be a width of 15 mm. The widened reinforcing fiber strand having the width of 15 mm was slit at an interval of 0.8 mm at a line speed of 35 m/sec and slit at an interval of 0.2 mm at a line speed of 15 m/sec by using a disk-shaped separation blade made of cemented carbide to be supplied to two sets of cutting apparatuses. The reinforcing fibers were cut by using a rotary cutter made of cemented carbide in which two blades were formed at an interval of 6 mm as the cutting apparatus so that the fiber length was 6 mm.

After the reinforcing fibers slit at an interval of 0.8 mm were cut by using the rotary cutter, the reinforcing fibers were introduced into the tapered tube at a suction wind velocity of 5 m/sec by supplying compressed air to the tapered tube arranged directly below the rotary cutter.

The reinforcing fibers slit at an interval of 0.2 mm were supplied to the cutting apparatus and then transported to a tube having a small hole of the spraying apparatus, and the compressed air was supplied to the small hole by using a compressor to open the reinforcing fibers. In this case, the ejection velocity from the small hole was 80 m/sec. Thereafter, the opened reinforcing fibers were introduced to the tapered tube and mixed with the reinforcing fibers slit at an interval of 0.8 mm in the tapered tube. Next, while a movable conveyer net was installed below the outlet of the tapered tube to perform suction by a blower below the net, the reinforcing fibers were supplied from the tapered tube to obtain the random mat of a fiber areal weight of 1,410 g/m². When the form of the reinforcing fibers in the reinforced-fiber random mat was observed, the fiber axes of the reinforcing fibers were almost parallel to a plane of the random mat, and the reinforcing fibers were randomly dispersed in the plane.

Subsequently, a molten matrix resin was supplied on the mat. That is, as the matrix resin, polyamide 6 (A1030, manufactured by Unitika Limited) was used and melted, a film-shaped molten resin body having a thickness of 1.2 mm was extruded from a T-die with a width of 1 m installed at an upper side of 5 cm from the conveyer net at the same speed as the line velocity, and the molten resin was supplied to the entire of the mat. In this case, a portion where the resin was supplied on the reinforcing fiber mat was heated by an infrared heater to prevent the resin from being cooled and solidified.

In addition, the apparatus was operated under a condition of a supply amount of the reinforcing fibers of 1,410 g/min and a supply amount of the matrix resin of 1,370 g/min, and the random mat constituted by the reinforcing fibers and the thermoplastic resin was formed on the fixed net. Subsequently, the random mat into which the resin was uniformly impregnated by heating and pressurized by a pair of heating rollers at a set temperature of 280° C.

The average fiber length of the reinforcing fibers of the obtained random mat was 6 mm, and the weight-average fiber thickness was 0.07 mm. The weight-average fiber width (Ww) of the reinforcing fibers constituting the random mat was 0.52 mm, the number-average fiber width (Wn) was 0.12 mm, and the dispersion ratio (Ww/Wn) was 4.31. Further, the fiber width and the fiber weight fraction were represented by a graph, and when positions of peaks of the fiber width distribution were checked, the peaks were verified at 0.08 mm and 0.79 mm of the fiber width.

The obtained random mat was heated at 4.0 MPa for 10 minutes by a press apparatus heated at 260° C. to obtain a molding plate having a thickness 2.0 mm. When the ultrasonic inspection test was performed at the obtained molding plate, a portion where the reflective wave strength was 70% or more was observed as 80% or more.

The volume content ratio of reinforcing fibers of the obtained molding plate was 40 Vol %, and as a result of evaluating a tensile characteristic based on JIS7164, tensile strength was 500 MPa, and tensile modulus was 51 GPa. Further, a ratio in tensile moduli of 0° direction and 90° direction was 1.03.

Example 3

As a reinforcing fiber, PAN-based carbon fibers "Tenax" (registered trademark) HTS40-12K strand manufactured by TOHO TENAX Co., Ltd. (fiber diameter of 7.0 µm, fiber width of 8 mm, and tensile strength of 4,200 MPa) were widened to have a width of 16 mm. Before the widened reinforcing fibers were processed by a separation apparatus, the widened fibers passed through a roller having an inner width of 15 mm, and the fiber width was accurately controlled to be a width of 15 mm. The widened reinforcing fiber strand having the width of 15 mm was slit at an interval of 5.0 mm at a line speed of 20 m/sec and slit at an interval of 0.5 mm at a line speed of 20 m/sec by using a disk-shaped separation blade made of cemented carbide to be supplied to two sets of cutting apparatuses. The reinforcing fibers were cut by using a rotary cutter made of cemented carbide in which blades were provided at an interval of 30 mm as the cutting apparatus to have the fiber length of 30 mm. The reinforcing fibers having two kinds of fiber widths were cut by the rotary cutter, respectively. One tapered tube connected from the outlet side of the rotary cutter was arranged below the rotary cutter. Compressed air was supplied to the tapered tube, each reinforcing fiber was introduced and transferred to the tapered tube at a suction wind velocity of 5 m/sec, and two reinforcing fibers were mixed in the tapered tube. As the matrix resin, from a side of the tapered tube, polycarbonate ("Panlite" (registered trademark) L-1225 Y, manufactured by Teijin Chemicals Ltd.) grinded and classified with a particle diameter of 500 µm was supplied. Next, while a movable conveyer net was installed below the outlet of the tapered tube to perform suction by a blower below the net, the reinforcing fibers were supplied from the tapered tube to obtain the random mat of a fiber areal weight of 2,900 g/m². When the form of the reinforcing fibers in the random mat was observed, the fiber axes of the reinforcing fibers were almost parallel to a plane of the random mat, and the reinforcing fibers were randomly dispersed in the plane.

The average fiber length of the reinforcing fibers of the obtained random mat was 30 mm, and the weight-average fiber thickness is 0.05 mm. The weight-average fiber width (Ww) of the reinforcing fibers constituting the random mat was 2.77 mm, the number-average fiber width (Wn) is 0.73 mm, and the dispersion ratio (Ww/Wn) was 3.82. Further, the fiber width and the fiber weight fraction were represented by a graph, and when positions of peaks of the fiber width distribution were checked, the peaks were verified at 0.48 mm and 5.00 mm of the fiber width.

The obtained random mat was heated at 4.0 MPa for 10 minutes by a press apparatus heated at 300° C. to obtain a molding plate having a thickness 3.0 mm. When the ultrasonic inspection test was performed at the obtained molding plate, a portion where the reflective wave strength was 70% or more was observed as 80% or more.

The volume content ratio of reinforcing fibers of the obtained molding plate was 55 Vol %, and as a result of evaluating a tensile characteristic based on JIS7164, the tensile strength was 600 MPa, and the tensile modulus was 44 GPa. Further, the ratio in tensile moduli of 0° direction and 90° direction was 1.07.

Comparative Example 1

As a reinforcing fiber, PAN-based carbon fibers "Tenax" (registered trademark) HTS40-12K strand manufactured by TOHO TENAX Co., Ltd. (fiber diameter of 7.0 µm, fiber width of 8 mm, and tensile strength of 4,200 MPa) was widened to have a width of 16 mm. Before the widened reinforcing fiber was processed by a separation apparatus, the widened fiber passed through a roller having an inner width of 15 mm, and the fiber width was accurately controlled to be a width of 15 mm. The separating apparatus slit the reinforcing fiber strand at an interval of 3.2 mm, by using a disk-shaped separation blade made of cemented carbide. The slit reinforcing fiber strand was cut to have a fiber length of 30 mm by using a rotary cutter in which blades were provided at an interval of 30 mm, as the cutting apparatus. The tapered tube was arranged directly below the rotary cutter. The cut reinforcing fibers were introduced and transferred to the tapered tube at a suction wind velocity of 5 m/sec by supplying compressed air to the tapered tube. As the matrix resin, from the side of the tapered tube, polycarbonate ("Panlite" (registered trademark) L-1225 Y, manufactured by Teijin Chemicals Ltd.) grinded and classified with a particle diameter of 500 µm was supplied. Next, while a movable conveyer net was installed below the outlet of the tapered tube to perform suction by a blower below the net, the reinforcing fibers were supplied from the tapered tube to obtain the random mat of a fiber areal weight of 2,900 g/m². When the form of the reinforcing fibers in the random mat was observed, the fiber axes of the reinforcing fibers were almost parallel to a plane of the random mat, and the reinforcing fibers were randomly dispersed in the plane.

The average fiber length of the reinforcing fibers of the obtained random mat was 30 mm, and the weight-average fiber thickness was 0.05 mm. The weight-average fiber width (Ww) of the reinforcing fibers constituting the random mat was 3.04 mm, the number-average fiber width (Wn) was 2.32 mm, and the dispersion ratio (Ww/Wn) was 1.31. Further, the fiber width and the fiber weight fraction were represented by a graph, and when positions of peaks of the fiber width distribution were checked, a single peak was verified at 3.18 mm of the fiber width.

The obtained random mat was heated at 4.0 MPa for 10 minutes by a press apparatus heated at 300° C. to obtain a molding plate having a thickness of 3.2 mm. When the ultrasonic inspection test was performed at the obtained molding plate, a portion where the reflective wave strength was 70% or more was observed as 58% or more, and the non-impregnation portion was checked in the molding plate.

The volume content ratio of reinforcing fibers of the obtained molding plate was 52 Vol %, and as a result of evaluating a tensile characteristic based on JIS7164, the tensile strength was 440 MPa, and the tensile modulus was 41 GPa. Further, the ratio in tensile moduli of 0° direction and 90° direction was 1.16.

Example 4

As a reinforcing fiber, PAN-based carbon fibers "Tenax" (registered trademark) UTS50-24K strand manufactured by TOHO TENAX Co., Ltd. (fiber diameter of 6.9 μm, fiber width of 10 mm, and tensile strength of 5,000 MPa) were widened to have a width of 22 mm. Before the widened reinforcing fibers were processed by a separation apparatus, the widened fibers passed through a roller having an inner width of 20 mm, and the fiber width was accurately controlled to be a width of 20 mm. The widened reinforcing fiber strand having the width of 20 mm was slit at an interval of 3.6 mm at a line speed of 35 m/sec and slit at an interval of 0.3 mm at a line speed of 15 m/sec by using a disk-shaped separation blade made of cemented carbide to be supplied to two sets of cutting apparatuses. The reinforcing fiber strand was cut by using a rotary cutter made of cemented carbide in which blades were provided at intervals of 20 mm and 4 mm to have fiber lengths of 20 mm and 4 mm, as the cutting apparatus, respectively.

After the reinforcing fiber strand slit at an interval of 3.6 mm was cut to 20 mm by using the rotary cutter, the reinforcing fibers were introduced into the tapered tube at a suction wind velocity of 5 m/sec by supplying compressed air to the tapered tube arranged directly below the rotary cutter.

The reinforcing fiber strand slit at an interval of 0.3 mm was cut to 4 mm and then transported to a tube having a small hole of the spraying apparatus, and the compressed air was supplied to the small hole by using a compressor to open the reinforcing fiber. In this case, the ejection velocity from the small hole was 80 m/sec. Thereafter, the reinforcing fibers slit at an interval of 0.3 mm were introduced to the tapered tube and mixed with the reinforcing fibers slit at an interval of 3.6 mm in the tapered tube. Further, as the matrix resin, from a side of the tapered tube, polyamide 6 ("A1030", manufactured by Unitika Limited) grinded and classified with a particle diameter of 500 μm was supplied, a movable conveyer net was installed below the outlet of the tapered tube, and the carbon fibers were supplied from the tapered tube by performing suction by a blower below the net to obtain the random mat of a fiber areal weight of 2,900 g/m². When the shape of the reinforcing fibers in the random mat was observed, the fiber axes of the reinforcing fibers were almost parallel to a plane of the random mat, and the reinforcing fibers were randomly dispersed in the plane.

The average fiber length of the reinforcing fibers of the obtained random mat was 15.2 mm, and the weight-average fiber thickness was 0.05 mm. The weight-average fiber width (Ww) of the reinforcing fibers constituting the random mat was 2.54 mm, the number-average fiber width (Wn) was 0.38 mm, and the dispersion ratio (Ww/Wn) was 6.68. Further, the fiber width and the fiber weight fraction were represented by a graph, and when positions of peaks of the fiber width distribution were checked, the peaks were verified at 0.15 mm and 3.57 mm of the fiber width. The obtained random mat was heated at 4.0 MPa for 10 minutes by a press apparatus heated at 260° C. to obtain a molding plate having a thickness 3.0 mm. When the ultrasonic inspection test was performed at the obtained molding plate, a portion where the reflective wave strength was 70% or more was observed as 80% or more.

The volume content ratio of reinforcing fibers of the obtained molding plate was 55 Vol %, and as a result of evaluating a tensile characteristic based on JIS7164, the tensile strength was 620 MPa, and the tensile modulus was 45 GPa. Further, the ratio in tensile moduli of 0° direction and 90° direction was 1.06.

Example 5

As a reinforcing fiber, PAN-based carbon fibers "Tenax" (registered trademark) STS40-24K strand manufactured by TOHO TENAX Co., Ltd. (fiber diameter of 7.0 μm, fiber width of 10 mm, and tensile strength of 4,000 MPa) were widened to have a width of 20 mm. Before the widened reinforcing fibers were processed by a separation apparatus, the widened fibers passed through a roller having an inner width of 18 mm, and the fiber width was accurately controlled to have a width of 18 mm. The widened reinforcing fiber strand having the width of 18 mm was slit at an interval of 5.8 mm at a line speed of 30 m/sec and slit at an interval of 0.3 mm at a line speed of 20 m/sec by using a disk-shaped separation blade made of cemented carbide to be supplied to two sets of cutting apparatuses, respectively. The reinforcing fiber strand was cut by using a rotary cutter made of cemented carbide in which two blades were provided at an interval of 20 mm as the cutting apparatus to have the fiber length of 20 mm.

After the reinforcing fiber slit at an interval of 5.8 mm was cut by using the rotary cutter, the reinforcing fibers were introduced into the tapered tube at a suction wind velocity of 5 m/sec by supplying compressed air to the tapered tube arranged directly below the rotary cutter.

The reinforcing fiber strand slit at an interval of 0.3 mm was cut and then transported to a tube having a small hole of the spraying apparatus, and the compressed air was supplied to the small hole by using a compressor to open the reinforcing fibers. In this case, the ejection velocity from the small hole was 80 m/sec. Thereafter, the opened reinforcing fiber slit at an interval of 0.3 mm were introduced to the tapered tube and mixed with the reinforcing fibers slit at an interval of 5.8 mm in the tapered tube. Further, as the matrix resin, from the side of the tapered tube, polyamide 6 ("A1030", manufactured by Unitika Limited) grinded and classified with a particle diameter of 500 μm was supplied, a movable conveyer net was installed below the outlet of the tapered tube, and the reinforcing fibers were supplied from the tapered tube by performing suction by a blower below the net to obtain the random mat of a fiber areal weight of 2,900 g/m². When the form of the reinforcing fibers in the random mat was observed, the fiber axes of the reinforcing fibers were almost parallel to a plane of the random mat, and the reinforcing fibers were randomly dispersed in the plane.

The average fiber length of the reinforcing fibers of the obtained random mat was 20 mm, and the weight-average fiber thickness was 0.06 mm. The weight-average fiber width (Ww) of the reinforcing fibers constituting the random mat was 3.55 mm, the number-average fiber width (Wn) was 0.37 mm, and the dispersion ratio (Ww/Wn) was 9.69. Further, the fiber width and the fiber weight fraction were represented by a graph, and when positions of peaks of the fiber width distribution were checked, the peaks were verified at 0.02 mm and 5.78 mm of the fiber width. The obtained random mat was heated at 4.0 MPa for 10 minutes by a press apparatus heated at 260° C. to obtain a molding plate having a thickness of 3.0 mm. When the ultrasonic inspection test was performed at the obtained molding plate, a portion where the reflective wave strength was 70% or more was observed as 80% or more.

The volume content ratio of reinforcing fibers of the obtained molding plate was 55 Vol %, and as a result of evaluating a tensile characteristic based on JIS7164, the tensile strength was 500 MPa, and the tensile modulus was 44 GPa. Further, the ratio in tensile moduli of 0° direction and 90° direction was 1.12.

Comparative Example 2

As a reinforcing fiber, PAN-based carbon fibers "Tenax" (registered trademark) HTS40-12K strand manufactured by TOHO TENAX Co., Ltd. (fiber diameter of 7.0 µm, fiber width of 8 mm, and tensile strength of 4,200 MPa) were cut by using a rotary cutter to have a fiber length of 6 mm.

The cut reinforcing fibers were supplied to a dispersion tank and stirred for 3 minutes in water of 15 L for the reinforcing fibers of 9 g to be dispersed in a dispersion liquid. After stirred for 3 minutes in the dispersion tank, slurry of the obtained reinforcing fibers was supplied to a rectangular papermaking apparatus of 300 mm×300 mm to obtain a papermaking base material having a reinforcing fiber areal weight of 100 g/m² by removing the dispersed liquid. The obtained papermaking base material was heated and dried at a temperature of 100° C. for 1 hour.

The weight-average fiber thickness of the reinforcing fibers constituting the obtained papermaking base material was 0.01 mm, the weight-average fiber width (Ww) was 0.01 mm, the number-average fiber width (Wn) was 0.01, and the dispersion ratio (Ww/Wn) was 1.0, and the reinforcing fibers were completely dispersed to be a single fiber.

The papermaking base material and a polypropylene film (J-106 G, manufactured by Prime Polymer Co., Ltd.) were alternately layered to have a reinforcing fiber (carbon fiber) heated and pressurized by a pair of heating rollers at a set temperature of 220° C. Thereafter, the papermaking base material and the polypropylene film were heated at 10 MPa for 10 minutes by a press apparatus heated at 220° C. to obtain a non-impregnated plate having a thickness of about 30 mm. The plate was released between layers because the resin was not sufficiently impregnated to evaluate mechanical strength.

In the obtained molding plate, the average fiber length of the reinforcing fibers was 2.1 mm. That is, the average fiber length of the reinforcing fibers was reduced by about ⅓ of the average fiber length of the reinforcing fibers during cutting before the papermaking base material was prepared. This is because the reinforcing fiber was damaged during papermaking and press-molding.

Comparative Example 3

As a reinforcing fiber, PAN-based carbon fibers "Tenax" (registered trademark) HTS40-12K strand manufactured by TOHO TENAX Co., Ltd. (fiber diameter of 7.0 µm, fiber width of 8 mm, and tensile strength of 4,200 MPa) were used. As the reinforcing fiber strand, the reinforcing fibers were slit at an interval of 1.0 mm at a line speed of 35 m/sec by using a disk-shaped separation blade and were not slit but passed at a line speed of 65 m/sec to be supplied to two sets of cutting apparatuses, respectively. The reinforcing fibers were cut by using a rotary cutter made of cemented carbide in which two blades were provided at an interval of 30 mm as the cutting apparatus to have the fiber length of 30 mm.

The reinforcing fiber strand slit at an interval of 1.0 mm was cut by the rotary cutter and then transported to a tube having a small hole of the spraying apparatus, and the compressed air was supplied to the small hole by using a compressor to open the reinforcing fiber. In this case, the ejection velocity from the small hole was 50 m/sec.

The non-slit reinforcing fibers were cut, and then introduced to the tapered tube arranged directly below the cutter at a suction velocity of 5 m/sec. Thereafter, each reinforcing fiber was introduced to the tapered tube, and two kinds of the reinforcing fibers were mixed in the tapered tube. Further, as the matrix resin, from the side of the tapered tube, polycarbonate ("Panlite" (registered trademark) L-1225Y, manufactured by Teijin Chemicals Ltd.) grinded and classified with a particle diameter of 500 µm was supplied, a movable conveyer net was installed below the outlet of the tapered tube, and the carbon fibers were supplied from the tapered tube by performing suction by a blower below the net to obtain the random mat of a fiber areal weight of 2,900 g/m². When the form of the reinforcing fibers in the random mat was observed, the fiber axes of the reinforcing fibers were almost parallel to a plane of the random mat, and the reinforcing fibers were randomly dispersed in the plane.

The average fiber length of the reinforcing fibers of the obtained random mat was 30 mm, and the weight-average fiber thickness was 0.07 mm. The weight-average fiber width (Ww) of the reinforcing fibers constituting the random mat was 5.17 mm, the number-average fiber width (Wn) was 1.94 mm, and the dispersion ratio (Ww/Wn) was 2.67. Further, the fiber width and the fiber weight fraction were represented by a graph, and when positions of peaks of the fiber width distribution were checked, the peaks were verified at 0.92 mm and 8.00 mm of the fiber width. The obtained random mat was heated at 4.0 MPa for 10 minutes by a press apparatus heated at 300° C. to obtain a molding plate having a thickness 3.2 mm. When the ultrasonic inspection test was performed at the obtained molding plate, a portion where the reflective wave strength was 70% or more was observed as 43% or more, and a lot of non-impregnation portion was checked in the molding plate.

The volume content ratio of reinforcing fibers of the obtained molding plate was 51 Vol %, and as a result of evaluating a tensile characteristic based on JIS7164, the tensile strength was 370 MPa, and the tensile modulus was 32 GPa. Further, the ratio in tensile moduli of 0° direction and 90° direction was 1.23.

INDUSTRIAL APPLICABILITY

Accordingly, since the random mat and the fiber-reinforced composite material shaped product obtained from the present invention have excellent mechanical strength, excellent isotropy, and high tensile modulus, the random mat and the fiber-reinforced composite material shaped product may be used in various kinds of constituent members, for example, an inner plate, an outer plate, and constituent members of a vehicle; and besides a frame, a housing, and so on of various kinds of electric products or a machine.

Although the present invention has been described with reference to detailed and specific embodiments thereof, it is obvious to those skilled in the art that various changes or modifications may be made without departing from the spirit and scope of the present invention.

This application is based on Japanese Patent Application No. 2012-171142 filed on Aug. 1, 2012, the entire contents of which are incorporated herein by reference.

DESCRIPTION OF REFERENCE NUMERAL AND SIGNS

1: Reinforcing fiber
2: pinch roller
3: Rubber roller
4: Rotary cutter main body
5: Blade
6: Cut reinforcing fiber
7: Pitch of blades
8: Widened reinforcing fiber
9: Widening apparatus
10: Fiber width control roller
11: Separation slitter
12: Separated reinforcing fiber

The invention claimed is:

1. A random mat, comprising:
carbon fiber bundles cut from carbon fiber strands each having a form in which single fibers are bundled, the carbon fiber bundles having an average fiber length of 3 to 100 mm; and
a thermoplastic resin,
wherein the carbon fiber bundles include single carbon fibers and a sizing agent that adheres to the single carbon fibers to bundle the single carbon fibers together, the single carbon fibers having a diameter of 1 μm to 12 μm,
fiber axes of the carbon fiber bundles are substantially parallel to a plane of the random mat,
the carbon fiber bundles are randomly dispersed in the plane of the random mat, the carbon fiber bundles satisfy the following i) to iv):
i) a weight-average fiber width (Ww) of the carbon fiber bundles satisfies the following Equation (1):

$$0.03 \text{ mm} < Ww < 5.0 \text{ mm} \quad (1);$$

ii) an average fiber width dispersion ratio (Ww/Wn) defined as a ratio of the weight-average fiber width (Ww) to a number-average fiber width (Wn) of the carbon fiber bundles is 1.8 or more and 20.0 or less;
iii) a weight-average fiber thickness of the carbon fiber bundles is smaller than the weight-average fiber width (Ww); and
iv) a fiber width distribution of the carbon fiber bundles included in the random mat has at least two peaks.

2. The random mat according to claim 1,
wherein the weight-average fiber width (Ww) of the carbon fiber bundles satisfies the following Equation (2):

$$0.1 \text{ mm} < Ww < 3.0 \text{ mm} \quad (2).$$

3. The random mat according to claim 1,
wherein the at least two peaks of fiber width distribution of the carbon fiber bundles included in the random mat include:
one peak in a range of 0.01 mm or more and less than 0.50 mm of the fiber width, and
another peak in a range of 0.50 mm or more and 2.00 mm or less of the fiber width.

4. The random mat according to claim 1,
wherein the at least two peaks of fiber width distribution of the carbon fiber bundles included in the random mat include:
one peak in a range of 0.10 mm or more and less than 1.00 mm of the fiber width, and
another peak in a range of 1.00 mm or more and 5.00 mm or less of the fiber width.

5. The random mat according to claim 1,
wherein the average fiber width dispersion ratio (Ww/Wn) of the carbon fiber bundles is more than 2.0 and 10.0 or less.

6. The random mat according to claim 1,
wherein the weight-average fiber thickness of the carbon fiber bundles is 0.01 mm or more and 0.30 mm or less.

7. The random mat according to claim 1,
wherein a reinforcing fiber areal weight is 25 to 10,000 g/m$^2$.

8. The random mat according to claim 1,
wherein a content of the thermoplastic resin is 10 to 800 parts by weight based on 100 parts by weight of the carbon fiber bundles.

9. A fiber-reinforced composite material shaped product obtained from the random mat according to claim 1.

10. The fiber-reinforced composite material shaped product according to claim 9,
wherein with respect to tensile modulus in two directions which are perpendicular to each other, a ratio obtained by dividing a larger value by a smaller value does not exceed 2.

11. The fiber-reinforced composite material shaped product according to claim 9,
wherein a thickness is 0.2 to 100 mm.

12. The random mat according to claim 1,
wherein the weight-average fiber thickness is ½ or less of the weight-average fiber width (Ww).

13. The random mat according to claim 1,
wherein the thermoplastic resin has a film shape and is mounted on a carbon fiber bundle mat.

14. The random mat according to claim 1,
wherein a fiber length distribution of the carbon fiber bundles included in the random mat has at least two peaks.

15. The random mat according to claim 1,
wherein the carbon fiber bundles are obtained by:
widening a strand of the carbon fiber bundles;
controlling the fiber width of the widened strand to be a desired width by using a control roller for controlling the fiber width;
separating the strand with the desired width to be bundles; and
cutting the bundles.

16. The random mat according to claim 1,
wherein the average fiber width dispersion ratio (Ww/Wn) of the carbon fiber bundles is more than 2.0 and 6.0 or less.

* * * * *